(12) United States Patent
Zhang et al.

(10) Patent No.: US 11,088,616 B2
(45) Date of Patent: Aug. 10, 2021

(54) ISOLATED CONVERTER WITH SWITCHED CAPACITORS

(71) Applicant: Silergy Semiconductor Technology (Hangzhou) LTD, Hangzhou (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/837,277

(22) Filed: Apr. 1, 2020

(65) Prior Publication Data

US 2020/0228005 A1 Jul. 16, 2020

Related U.S. Application Data

(63) Continuation of application No. 15/864,085, filed on Jan. 8, 2018, now Pat. No. 10,673,324.

(30) Foreign Application Priority Data

Jan. 11, 2017 (CN) .......................... 201710018391.3
Mar. 1, 2017 (CN) .......................... 201710117744.5

(51) Int. Cl.
*H02M 3/07* (2006.01)

(52) U.S. Cl.
CPC ........ *H02M 3/07* (2013.01); *H02M 2003/072* (2013.01)

(58) Field of Classification Search
CPC ............. H02M 3/07; H02M 2003/072; H02M 2003/077
See application file for complete search history.

(56) References Cited

U.S. PATENT DOCUMENTS

| | | | |
|---|---|---|---|
| 7,602,232 B2 | 10/2009 | Georgescu et al. | |
| 8,427,851 B2 | 4/2013 | Lesso | |
| 8,687,382 B2 | 4/2014 | Chen | |
| 8,699,248 B2 | 4/2014 | Giuliano et al. | |
| 9,295,116 B2 | 3/2016 | Sanders et al. | |
| 9,473,034 B2 | 10/2016 | Huang et al. | |
| 9,627,972 B2 | 4/2017 | Mao et al. | |
| 9,762,128 B2 | 9/2017 | Zhang et al. | |
| 10,084,384 B1 * | 9/2018 | Kotikalapoodi | ...... H02M 3/158 |
| 2013/0257410 A1 | 10/2013 | Gardner et al. | |

* cited by examiner

*Primary Examiner* — Jung Kim
(74) *Attorney, Agent, or Firm* — Michael C. Stephens, Jr.

(57) ABSTRACT

An isolated converter with switched capacitors can include: a first capacitor; a first group of switches coupled between two terminals of an input port, where the first group of switches is configured to selectively couple a first terminal of the first capacitor to one of a first terminal and a second terminal of the input port; a second group of switches coupled between two terminals of an output port, where the second group of switches is configured to selectively couple a second terminal of the first capacitor to one of a first terminal and a second terminal of the output port; and a second capacitor coupled between one of the first and second terminals of the input port and one of the first and second terminals of the output port.

19 Claims, 28 Drawing Sheets

ISOLATED CONVERTER WITH SWITCHED CAPACITORS

RELATED APPLICATIONS

This application is a continuation of the following application, U.S. patent application Ser. No. 15/864,085, filed on Jan. 8, 2018, now issued as U.S. Pat. No. 10,673,324, and which is hereby incorporated by reference as if it is set forth in full in this specification, and which also claims the benefit of Chinese Patent Application No. 201710018391.3, filed on Jan. 11, 2017, and of Chinese Patent Application No. 201710117744.5, filed on Mar. 1, 2017, both of which are incorporated herein by reference in its entirety.

FIELD OF THE INVENTION

The present invention generally relates to the field of power electronics, and more particularly to an isolated converter with switched capacitors.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
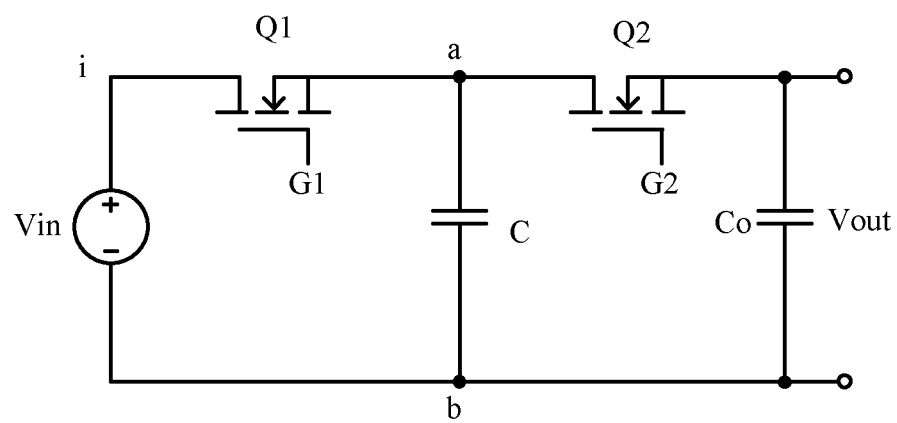
FIG. 1 is a schematic block diagram of an example converter with switched capacitors.
Figure 2:
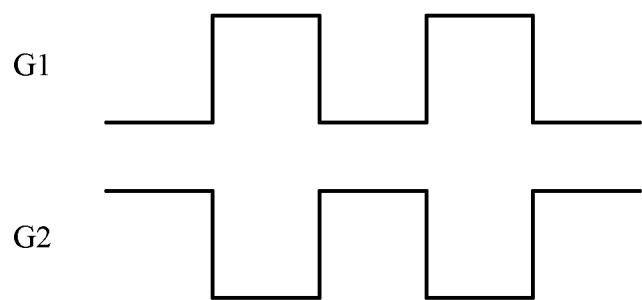
FIG. 2 is a waveform diagram of example control signals of the converter of FIG. 1.

Referring now to FIG. 1, shown is a schematic block diagram of an example converter with switched capacitors. Also referring now to FIG. 2, shown is a waveform diagram of example control signals of the converter of FIG. 1. The switch capacitor converter can realize voltage or current conversion by controlling the charge and discharge process of capacitors through switches. Switch Q1 can connect between terminal a of capacitor C and terminal i of the input port, and can be controlled by control signal G1. Switch Q2 can connect between terminal a of capacitor C and a first terminal of the output port, and can be controlled by control signal G2. For example, control signals G1 and G2 may be complementary (e.g., when control signal G1 is high, control signal G2 is low, etc.).

In addition, terminal b of capacitor C can connect to a second terminal of the input port and a second terminal of the output port. The second terminals of the input port and the output port may be configured as reference terminals (e.g., ground terminals). Output capacitor Co may be provided at the output port in order to smooth output voltage Vout. In this way, capacitor C may be intermittently discharged to the output terminal by alternately turning on and turning off switches Q1 and Q2, in order to realize power transmission and voltage/current conversion. However, in this case, the input port and the output port are commonly grounded, and capacitor C intermittently outputs a current to the output port. As a result, unexpected current ripples on the input power supply and the output capacitor can be relatively large. Further, such an isolated converter can be relatively bulky with a coil, and difficult to utilize in miniaturized system applications.

In one embodiment, an isolated converter with switched capacitors can include: (i) a first capacitor; (ii) a first group of switches coupled between two terminals of an input port, where the first group of switches is configured to selectively couple a first terminal of the first capacitor to one of a first terminal and a second terminal of the input port; (iii) a second group of switches coupled between two terminals of an output port, where the second group of switches is configured to selectively couple a second terminal of the first capacitor to one of a first terminal and a second terminal of the output port; and (iv) a second capacitor coupled between one of the first and second terminals of the input port and one of the first and second terminals of the output port.

Figure 3:
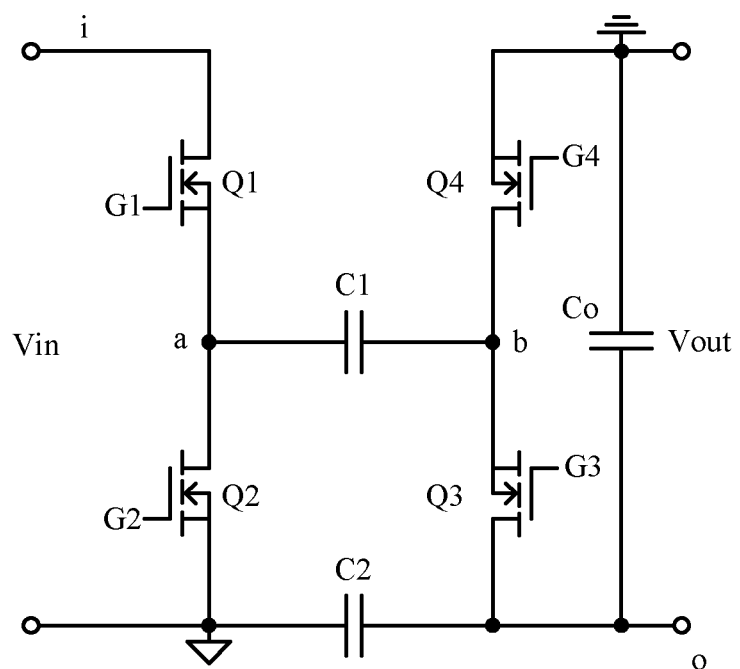
FIG. 3 is a schematic block diagram of a first example isolated converter with switched capacitors, in accordance with embodiments of the present invention.

Referring now to FIG. 3, shown is a schematic block diagram of a first example isolated converter with switched capacitors, in accordance with embodiments of the present invention. In this particular example, the isolated converter with switched capacitors 1 can include capacitor C1, capacitor C2, switches Q1 and Q2, and switches Q3 and Q4. Switches Q1 and Q2 may be serially coupled between two terminals of the input port. Switches Q3 and Q4 can be serially coupled between two terminals of the output port. Switches Q1-Q4 may be separately controlled by control signals G1-G4. The common node of switches Q1 and Q2 can connect to terminal a of capacitor C1, the common node of the switches Q3 and Q4 can connect to terminal b of capacitor C1. For example, switch Q1 can connect between terminal i of the input port and terminal a of capacitor C1, and switch Q2 can connect between the second terminal of the input port and terminal a of capacitor C1.

Switches Q1 and Q2 can be controlled to be turned on or turned off to selectively couple terminal a of capacitor C1 to terminal i or the second terminal of the input port. When switch Q1 is turned on and switch Q2 is turned off, terminal a of capacitor C1 can be coupled to the first terminal of the input port. When switch Q1 is turned off and switch Q2 is turned on, terminal a of capacitor C1 can connect to the second terminal of the input port. Similarly, switch Q3 can connect between terminal o of the output port and the second terminal of capacitor C1, and switch Q4 can connect between the second terminal of the output terminal and terminal b of capacitor C1. Switches Q3 and Q4 can be controlled to be turned on or turned off to selectively couple terminal b of capacitor C1 to the first or second terminal of the output port. When switch Q3 is turned on and switch Q4 is turned off, terminal b of capacitor C1 can be coupled to terminal o of the output port. When switch Q3 is turned off and switch Q4 is turned on, terminal b of capacitor C1 can be coupled to the second terminal of the output port.

In particular embodiments, switches Q1-Q4 can employ various electric-controlled switching components (e.g., metal-oxide-semiconductor field-effect transistors (MOSFET), bipolar junction transistors (BJT), insulated-gate-bipolar transistors (IGBT), etc.). Also, capacitor C2 can connect between the second terminal of the input port and terminal o of the output terminal.

Figure 4:
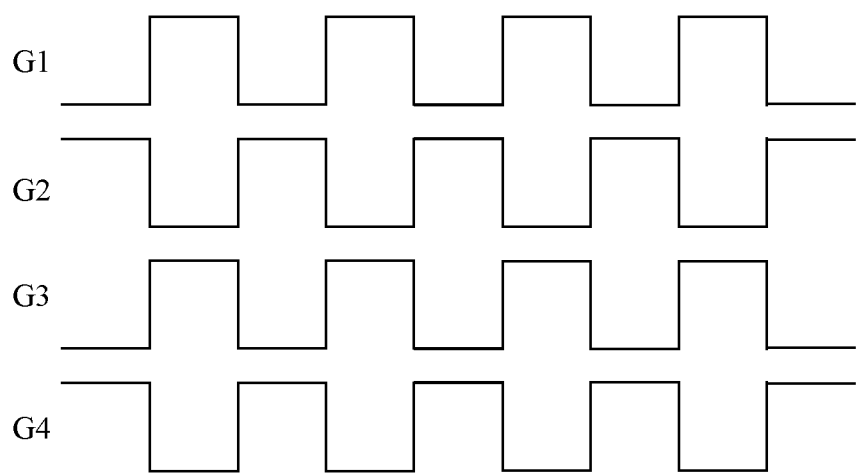
FIG. 4 is a waveform diagram of example control signals of the first example isolated converter with switched capacitors, in accordance with embodiments of the present invention.

Referring now to FIG. 4, shown is a waveform diagram of example control signals of the first example isolated converter with switched capacitors, in accordance with embodiments of the present invention. In this example, the switches are turned on when corresponding control signals are high, and turned off when corresponding control signals are low. Also for example, control signals G1 and G3 are in phase, and control signals G2 and G4 are in phase, while control signals G1 and G3 are opposite (or complementary) to control signals G2 and G4. That is, when control signals G1 and G3 are high, control signals G2 and G4 are low, and when control signals G1 and G3 are low, control signals G2 and G4 are high.

In this particular example, the duty cycle of the two groups of control signals can be about 50%. As such, the isolated converter with switched capacitors may have the same time in a first state and in a second state. Also, the output voltage or output current can be regulated according to the duty cycle of the control signals. For example, the two groups of control signals may have dead zones. The dead zones are protection time periods during which the upper and lower switches in the H-bridge or half-H-bridge may not be turned on at the same time because of potential problems of switching speed when outputting the pulse-width modulation (PWM) signal. The dead zones may also be referred to as PWM response time periods. Thus, control signals G1-G4 can respectively be used to control the turn on and turn off of switches Q1-Q4, such that the isolated converter with switched capacitors is alternately switched between the first state and the second state.

Figure 5:
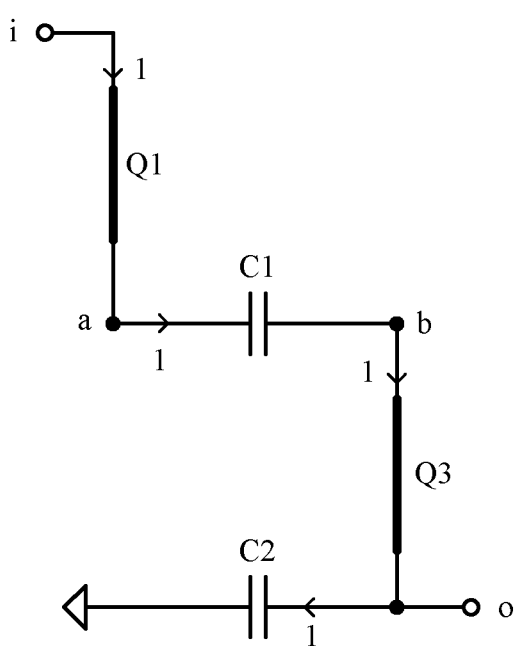
FIG. 5 is an example equivalent circuit diagram of the first example isolated converter with switched capacitors in a first state, in accordance with embodiments of the present invention.
Figure 6:
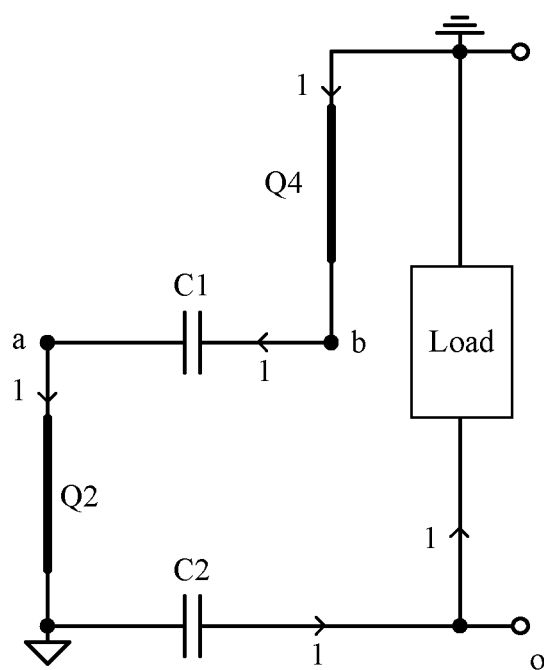
FIG. 6 is an example equivalent circuit diagram of the first example isolated converter with switched capacitors in a second state, in accordance with embodiments of the present invention.

Referring now to FIGS. 5 and 6, shown are example equivalent circuit diagrams of the first example isolated converter with switched capacitors in the first/second state, in accordance with embodiments of the present invention. When switches Q1 and Q3 are turned on, switches Q2 and Q4 are turned off, and the equivalent circuit diagram of the isolated converter with switched capacitors in this example are shown in FIG. 5. In this state, capacitors C1 and C2 can be coupled in series between two terminals of the input port. Thus, input voltage Vin can charge capacitors C1 and C2 through the formed current loop. The charging current can flow from terminal i of the input port to the second terminal of the input port through switch Q1, capacitor C1, switch Q3, and capacitor C2.

When switches Q1 and Q3 are turned off, switches Q2 and Q4 are turned on, and the equivalent circuit diagram of the isolated converter with switched capacitors in this example are shown in FIG. 6. In this state, capacitors C1 and C2 can be coupled in series between the two terminals of the input port. Capacitors C1 and C2 being charged in the previous state may discharge to the output terminals. The discharging current can flow from the second terminal of the output port to the load that is coupled to the output port through switch Q4, capacitor C1, switch Q2, and capacitor C2. For example, the isolated converter with switched capacitors of this example may include capacitor Co to smooth the output voltage. In the first state, capacitors C1 and C2 can be charged via the input port, and in the second state, capacitors C1 and C2 may be coupled in series to the output port, in order to discharge to the output port. In either state, capacitors can be coupled between any two terminals of the input port and the output port for isolation. Thus, effects of the output port on the input port can be eliminated.

Figure 7:
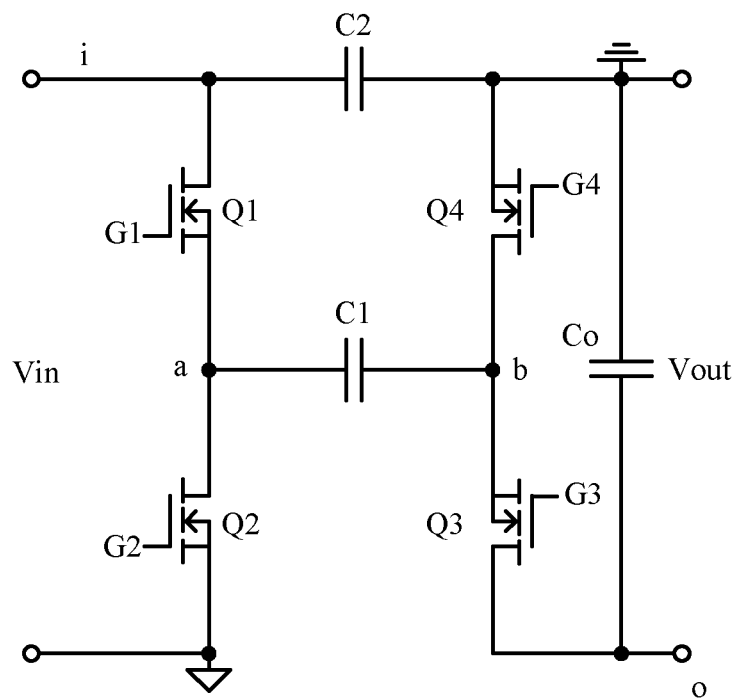
FIG. 7 is a schematic block diagram of a second example isolated converter with switched capacitors, in accordance with embodiments of the present invention.

Referring now to FIG. 7, shown is a schematic block diagram of a second example isolated converter with switched capacitors, in accordance with embodiments of the present invention. In this particular embodiment, capacitor C2 can connect between terminal i of the input port and the second terminal of the output port. Switches Q1-Q4 can be turned on and turned off as in the above example, and the isolated converter with switched capacitors can be switched in two states (e.g., the state in which capacitors C1 and C2 are coupled in series between two terminals of the output port, and the state in which capacitors C1 and C2 are coupled in series between two terminals of the input port). That is, when switches Q1 and Q3 are turned on, switches Q2 and Q4 are turned off, and capacitors C1 and C2 can be coupled in series between two terminals of the output port. When switches Q1 and Q3 are turned off, switches Q2 and Q4 are turned on, and capacitors C1 and C2 can be coupled in series between two terminals of the input port.

Figure 8:
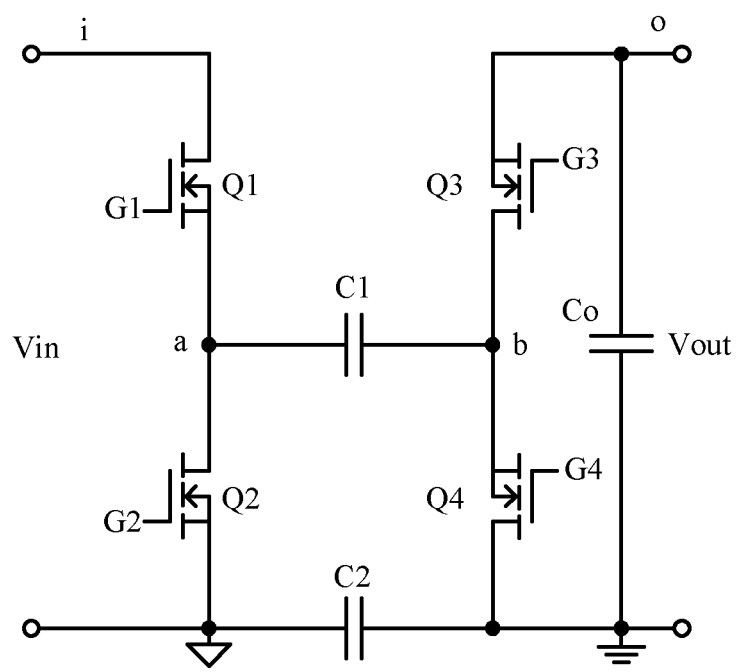
FIG. 8 is a schematic block diagram of a third example isolated converter with switched capacitors, in accordance with embodiments of the present invention.

Referring now to FIG. 8, shown is a schematic block diagram of a third example isolated converter with switched capacitors, in accordance with embodiments of the present invention. In this particular embodiment, capacitor C2 can connect between the second terminal of the input port and the second terminal of the output port (e.g., between the reference terminals of the input port and the output port). Also for example, when switch Q1 is turned on, switch Q2 can be turned off, such that terminal a of capacitor C1 is coupled to the first terminal of the input port. When switch Q1 is turned off and switch Q2 is turned on, the first terminal of capacitor C1 can be coupled to the second terminal of the input port. When switch Q3 is turned on and switch Q4 is turned off, terminal b of capacitor C1 can be coupled to terminal o of the output port. When switch Q3 is turned off and switch Q4 is turned on, terminal b of capacitor C1 can be coupled to the second terminal of the output port.

Also, switches Q1-Q4 can be controlled by control signals G1-G4 as shown above in FIG. 4. For example, switches Q1 and Q3 can be controlled to be turned on and turned off at substantially the same time, and switches Q2 and Q4 can be controlled to be turned on and turned off at the same time, but switches Q1 and Q3 may not be turned on simultaneously with switches Q2 and Q4. Thus, the isolated converter with switched capacitors in this particular example can alternately switches between the first state and the second state.

Figure 9:
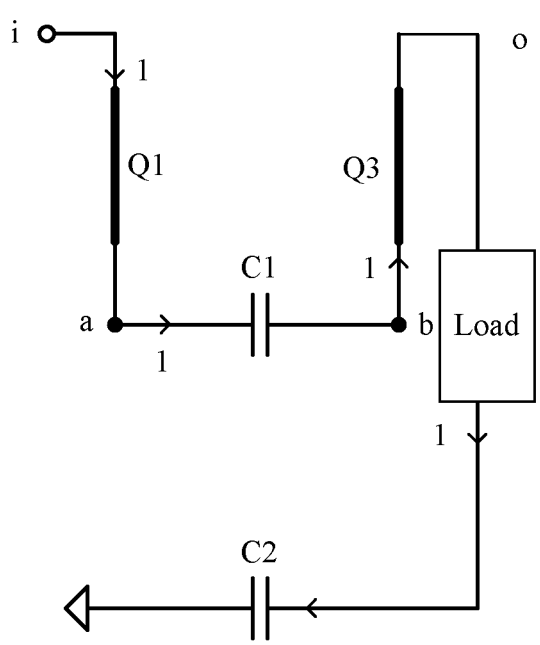
FIG. 9 is an example equivalent circuit diagram of the third example isolated converter with switched capacitors in the first state, in accordance with embodiments of the present invention.
Figure 10:
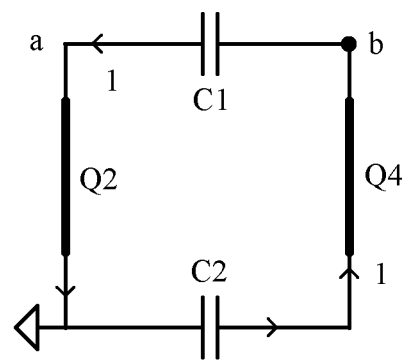
FIG. 10 is an example equivalent circuit diagram of the third example isolated converter with switched capacitors in the second state, in accordance with embodiments of the present invention.

Referring now to FIGS. 9 and 10, shown are example equivalent circuit diagrams of the third example isolated converter with switched capacitors in the first/second state, in accordance with embodiments of the present invention. In FIG. 9, in the first state, switches Q1 and Q3 are turned on, and switches Q2 and Q4 are turned off. In this state, capacitor C1 can be coupled between the high voltage terminals of the input port and the output port, and capacitor C2 can be coupled between the reference terminals of the input port and the output port. Thus, the current may flow in the loop formed by the voltage terminal of the input port, capacitor C1, the load, and capacitor C2. In the first state, capacitor C1 can be charged and the load may be powered by discharging the input port and capacitor C2.

As shown in FIG. 10, in the second state, switches Q2 and Q4 are turned on, and switches Q1 and Q3 are turned off. In this state, capacitors C1 and C2 can be coupled between the reference terminals of the input port and the output port to form a current loop, and capacitor C1 can discharge while capacitor C2 is charging, in order to regulate the capacitor state. In the first state, capacitors C1 and C2 can be coupled in series between two terminals of the input port, and the load can be powered. In the second state, capacitors C1 and C2 may form a current loop to redistribute the charge, in order to prepare for the current flowing through the capacitor after next being switched to the first state. In either state, capacitors may be coupled between any two terminals of the input port and the output port for isolation. Thus, possible effects of the output port on the input port can be substantially eliminated.

Figure 11:
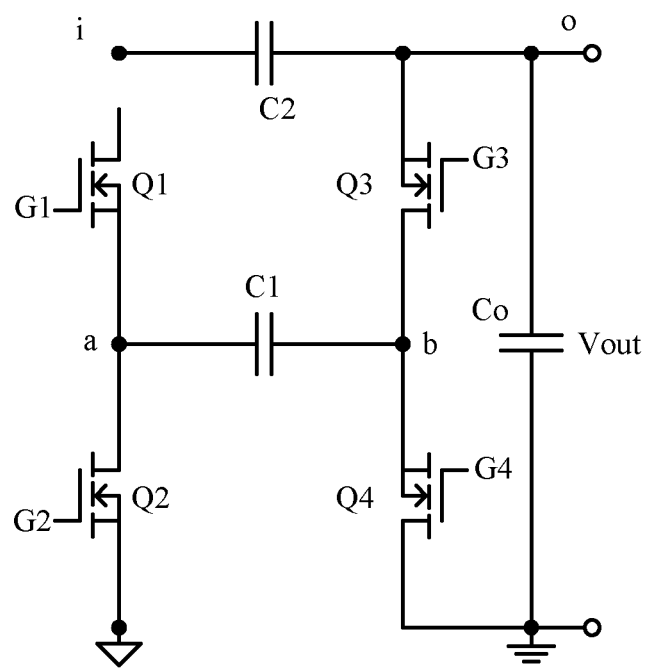
FIG. 11 is a schematic block diagram of a fourth example isolated converter with switched capacitors, in accordance with embodiments of the present invention.

Referring now to FIG. 11, shown is a schematic block diagram of a fourth example isolated converter with switched capacitors, in accordance with embodiments of the present invention. In this particular example, capacitor C2 can connect between terminal i of the input port and terminal o of the output port (e.g., between the high voltage terminals of the input port and the output port). Also, when switch Q1 is turned on, switch Q2 can be turned off, such that terminal a of capacitor C1 is coupled to the first terminal of the input port. When switch Q1 is turned off and switch Q2 is turned on, the first terminal of capacitor C1 can be coupled to the second terminal of the input port. When switch Q3 is turned on and switch Q4 is turned off, terminal b of capacitor C1 can be coupled to terminal o of the output port. When switch Q3 is turned off and switch Q4 is turned on, terminal b of capacitor C1 can be coupled to the second terminal of the output port.

Also, switches Q1-Q4 can be controlled by control signals G1-G4, as shown in the example of FIG. 4. For example, switches Q1 and Q3 can be turned on and turned off at substantially the same time, and switches Q2 and Q4 can be controlled to be turned on and turned off at substantially the same time, but switches Q1 and Q3 may not turned be on simultaneously with switches Q2 and Q4. Thus, the isolated converter with switched capacitors in this particular example can alternately switch between the first state and the second state.

Figure 12:
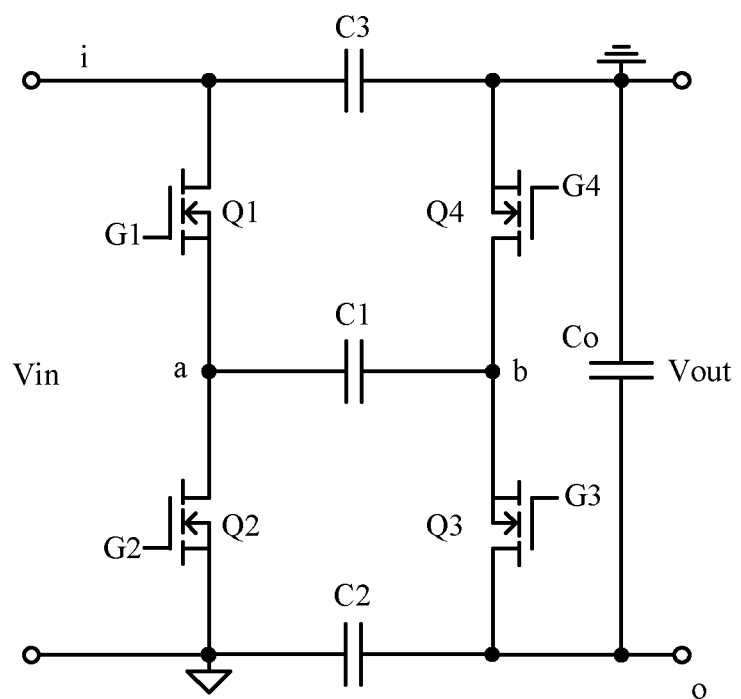
FIG. 12 is a schematic block diagram of a fifth example isolated converter with switched capacitors, in accordance with embodiments of the present invention.

Referring now to FIG. 12, shown is a schematic block diagram of a fifth example isolated converter with switched capacitors, in accordance with embodiments of the present invention. In this particular example, the isolated converter with switched capacitors can include capacitor C1, capacitor C2, capacitor C3, switches Q1 and Q2, and switches Q3 and Q4. Here, capacitor C2 can connect between the reference terminals of the input port and the output port (e.g., capacitor C3 can connect between the high voltage terminals of the input port and the output port). That is, capacitor C3 may be symmetrically arranged with capacitor C2 with respect to the first and second examples discussed above.

Figure 13:
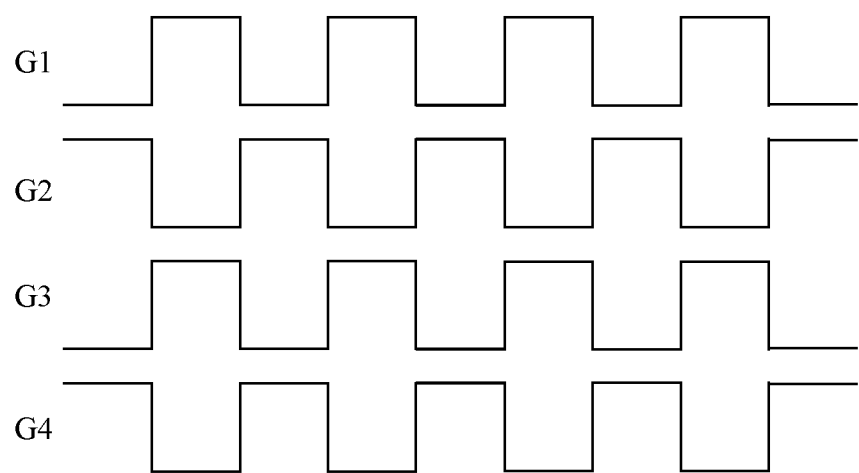
FIG. 13 is a waveform diagram of example control signals of the fifth example isolated converter with switched capacitors, in accordance with embodiments of the present invention.

Referring now to FIG. 13, shown is a waveform diagram of example control signals of the fifth example isolated converter with switched capacitors, in accordance with embodiments of the present invention. In this particular example, control signals G1-G4 may be respectively used to control switches Q1-Q4. Also, control signals G1 and G3 can be in phase, and control signals G2 and G4 are in phase, while the two groups of control signals can be opposite (or complementary) to each other. That is, when control signals G1 and G3 are high, control signals G2 and G4 may be low, and when control signals G1 and G3 are low, control signals G2 and G4 may be high. Under the control of control signals G1-G4, switches Q1 and Q3 can be turned on and off at substantially the same time, and switches Q2 and Q4 may be turned on and off at substantially the same time. When switches Q1 and Q3 are turned on, switches Q2 and Q4 can be turned off. Also, when switches Q1 and Q3 are turned off, switches Q2 and Q4 can be turned on. Thus, the isolated converter with switched capacitors in this particular example may alternately switch between the first state and the second state.

Figure 14:
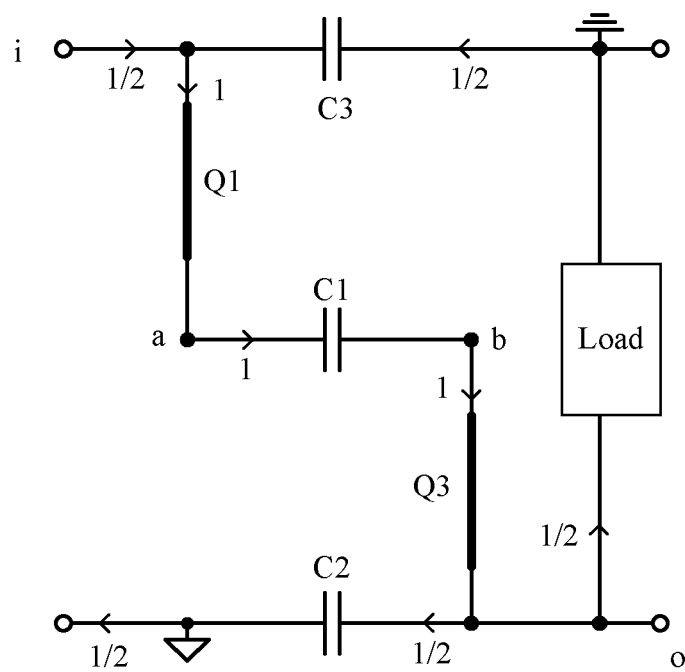
FIG. 14 is an example equivalent circuit diagram of the fifth example isolated converter with switched capacitors in the first state, in accordance with embodiments of the present invention.
Figure 15:
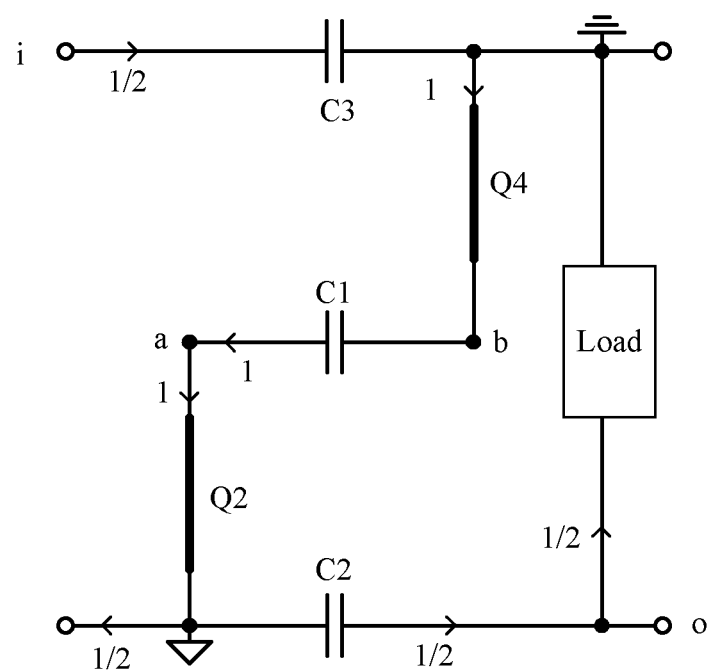
FIG. 15 is an example equivalent circuit diagram of the fifth example isolated converter with switched capacitors in the second state, in accordance with embodiments of the present invention.

Referring now to FIGS. 14 and 15, shown are example equivalent circuit diagrams of the fifth example isolated converter with switched capacitors in the first/second state, in accordance with embodiments of the present invention. As shown in FIG. 14, in the first state, for example, when switches Q1 and Q3 are turned on, switches Q2 and Q4 can be turned off, capacitors C1 and C2 can be coupled in series between two terminals of the input port, and the input port may charge capacitors C1 and C2. Also, since capacitor C2 is coupled between high voltage terminal i of the input port and the reference terminal of the output port, capacitors C1 and C3 can be coupled in series to the output port as seen from the output port side. Therefore, capacitor C3 can charge capacitor C1 and may simultaneously supply power to the output port. Thus, in the first state, not all the capacitors are charged, and some of the capacitors may be charged while some of the capacitors are discharged to the output port. For example, if the current flowing through capacitor C1 is 1, the current flowing through the input port is ½, and the current flowing from the reference terminal of the output port to capacitor C3 is ½. Also for example, the current flowing from capacitor C2 to the reference terminal of the input port is ½, and the current flowing to the output port is ½.

As shown in FIG. 15, in the second state, for example, when switches Q1 and Q3 are turned off, switches Q2 and Q4 can be turned on, capacitors C3 and C1 may be coupled in series between two terminals of the input port, and capacitors C1 and C2 can be coupled in series between the two terminals of the output port. In this way, the input port can charge capacitor C3 together with capacitor C1. The current can flow to the reference terminal of the input port through capacitor C3, switch Q4, capacitor C1, and switch Q1. Also, capacitors C1 and C2 may form a loop with the load, so as to supply power to the output port. For example, if the current flowing through capacitor C1 is 1, the current flowing through the input port is ½, and the current flowing through capacitors C2 and C3 is ½. Thus, in the second state, not all the capacitors may be charged, and some of the capacitors can be charged while some of the capacitors are discharged. Further, while the currents flowing through capacitors C2 and C3 are described herein as being set as equal, those skilled in the art will recognize that the capacitance value of the capacitors and the duty cycle of the control signals can be set in order to change the ratio of the current as needed for any particular application.

In this particular embodiment, in either state, capacitors for supplying power to the output port can be utilized to maintain the output current, to reduce the current ripple at the output port, and to improve the system performance. Since the current ripple may be reduced, the capacitance value of the input and output capacitors may also be reduced, in order to reduce the associated production costs. Moreover, in either state, the capacitors can exist between two terminals of the input port and the output port. Thus, the input port and the output port may be substantially isolated from each other.

Figure 16:
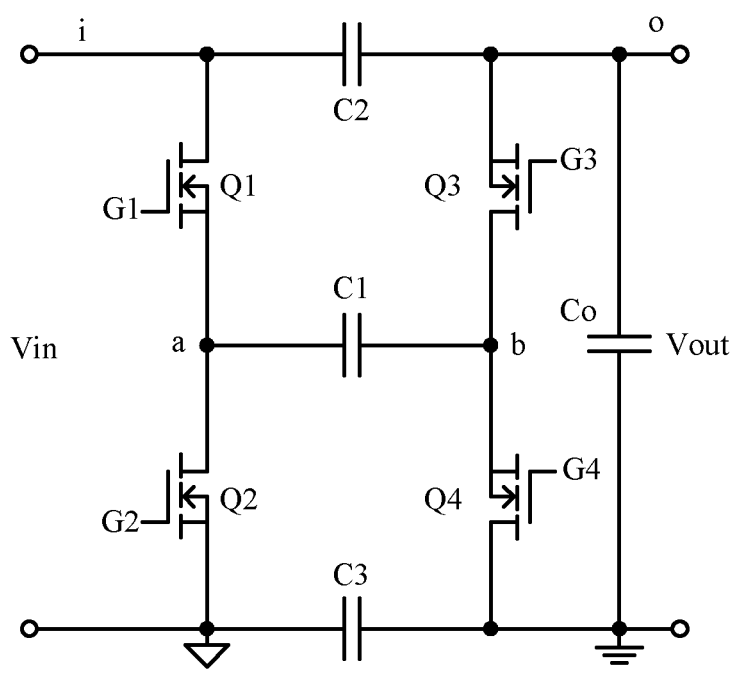
FIG. 16 is a schematic block diagram of a sixth example isolated converter with switched capacitors, in accordance with embodiments of the present invention.

Referring now to FIG. 16, shown is a schematic block diagram of a sixth example isolated converter with switched capacitors, in accordance with embodiments of the present invention. In this particular example, capacitor C2 can be coupled between the high voltage terminals of the input port and the output port, and capacitor C3 may be symmetrically arranged between the reference terminals of the input port and the output port. Switches Q1-Q4 in this example can be controlled by control signals G1-G4, as shown in FIG. 13. For example, switches Q1 and Q3 can be controlled to be turned on and off at substantially the same time, and switches Q2 and Q4 may be controlled to be turned on and off at substantially the same time, but switches Q1 and Q3 may not be turned on simultaneously with switches Q2 and Q4. Thus, the isolated converter with switched capacitors in this particular example can alternately switch between the first state and the second state.

Figure 17:
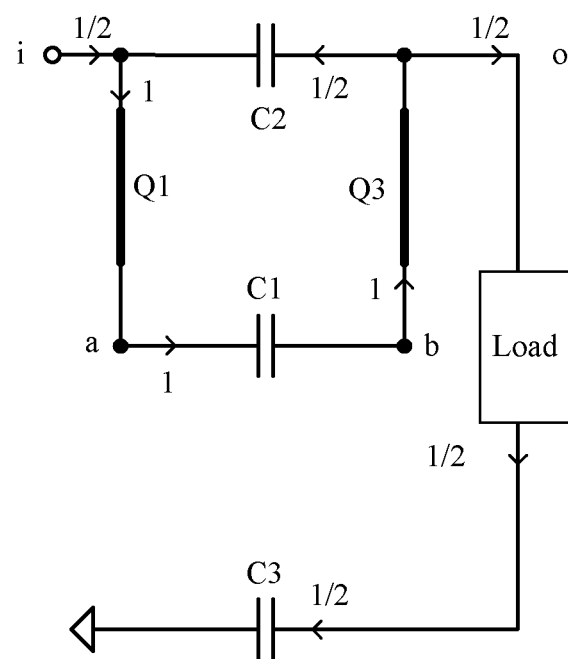
FIG. 17 is an example equivalent circuit diagram of the sixth example isolated converter with switched capacitors in the first state, in accordance with embodiments of the present invention.
Figure 18:
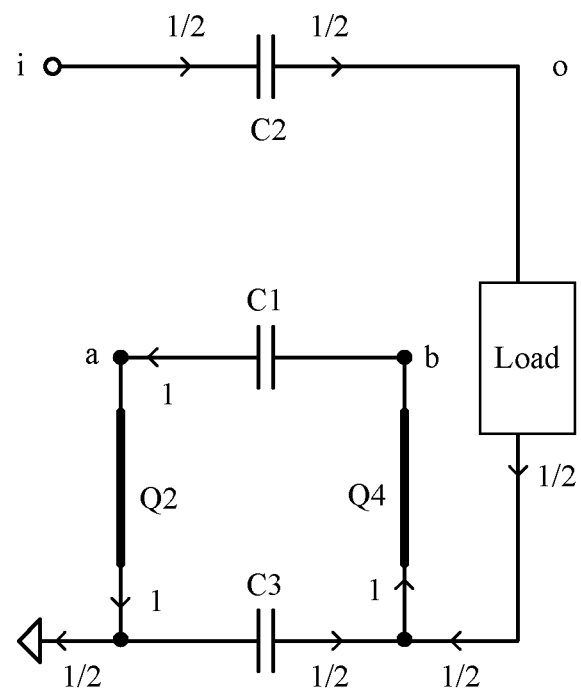
FIG. 18 is an example equivalent circuit diagram of the sixth example isolated converter with switched capacitors in the second state, in accordance with embodiments of the present invention.

Referring now to FIGS. 17 and 18, shown are example equivalent circuit diagrams of the example isolated converter with switched capacitors in the first/second state, in accordance with embodiments of the present invention. As shown in FIG. 17, in the first state (e.g., when switches Q1 and Q3 are turned on, and switches Q2 and Q4 are turned off), capacitors C1, the load, and capacitor C3 can be coupled in series between the high terminal and the reference terminal of the input port. The input port can charge capacitors C1 and may supply power to the load, and capacitors C2 and C1 can form a current loop, and the current flowing through capacitor C1 can be shunted. For example, if the current flowing through capacitor C1 is 1, the current flowing through the input port is ½, and the currents flowing through capacitors C2 and C3 are ½.

As shown in FIG. 18, in the second state (e.g., when switches Q1 and Q3 are turned off, and switches Q2 and Q4 are turned on), capacitors C2, the load, and capacitor C1 can be coupled in series between the high terminal and the reference terminal of the input port. The input port may supply power to the load through capacitor C2, and capacitor C1 can be reversely discharged, such that that the current flows from the load to the reference terminal of the input port. Also, capacitors C3 and C1 may form a current loop, and the current flowing through capacitor C1 can be shunted. For example, if the current flowing through capacitor C1 is 1, the current flowing through the input port is ½, and the current flowing through capacitors C2 and C3 is ½. In this example, in the first and second states, the currents flowing through capacitors C1, C2 and C3 can be opposite. Thus, by repeat switching between the first and second states, the power supply to the load at the output port can be substantially guaranteed with the capacitor isolation.

In this particular example, in either state, capacitors for supplying power to the output port can exist, so as to continuously maintain the output current, to reduce the current ripple at the output port, and to improve the system performance. Since the current ripple is reduced, the capacitance value of the input and output capacitors can also be reduced, so as to reduce the associated production costs. Moreover, in either state, the capacitors can exist between two terminals of the input port and the output port such that the input port and the output port are isolated from each other.

Figure 19:
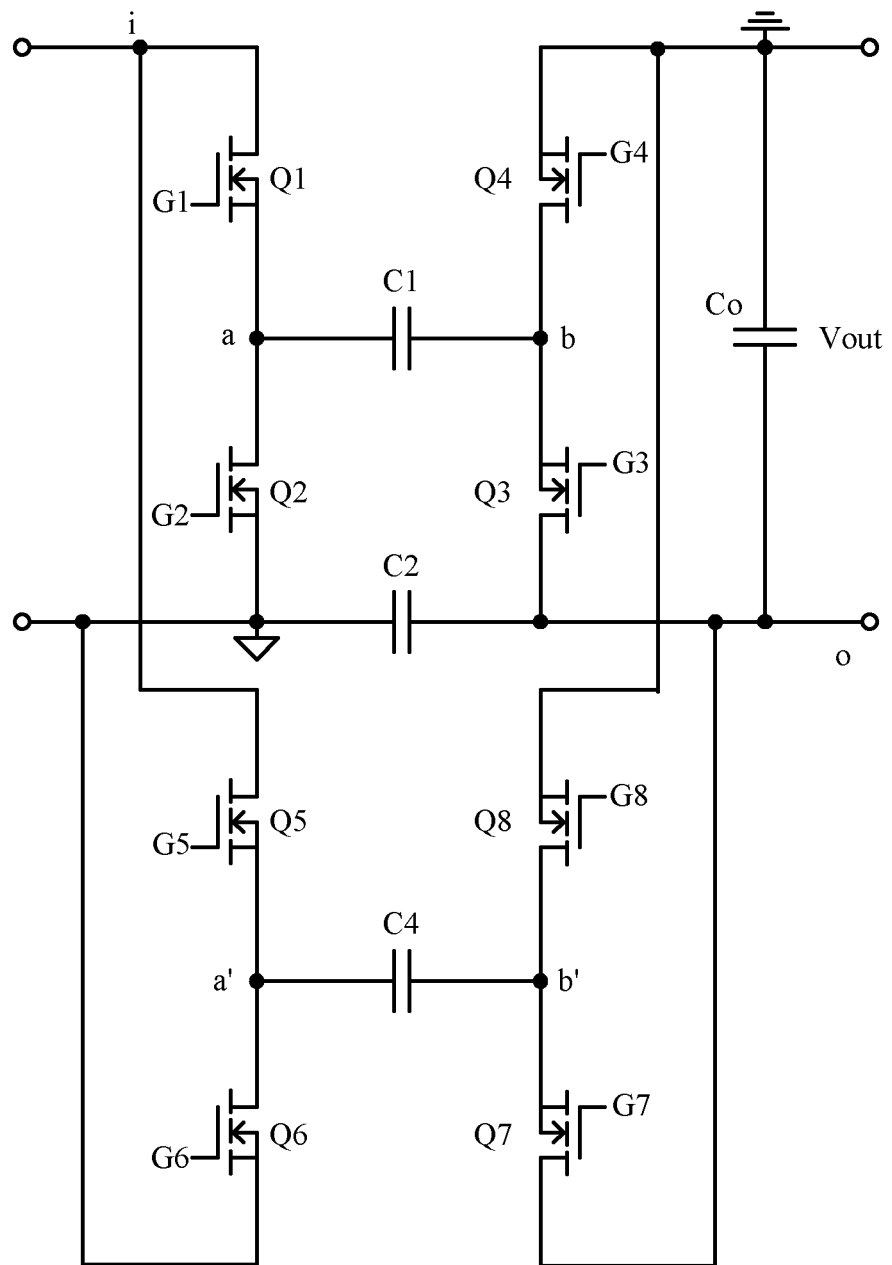
FIG. 19 is a schematic block diagram of a seventh example isolated converter with switched capacitors, in accordance with embodiments of the present invention.

Referring now to FIG. 19, shown is a schematic block diagram of a seventh example isolated converter with switched capacitors, in accordance with embodiments of the present invention. In this particular example, capacitor C4, switches Q5 and Q6, and switches Q7 and Q8 can be included. Capacitor C4 and switches Q5-Q8 may form an "H"-shape circuit to couple with the input port and the output port. The "H"-shape circuit may have the same topology as the circuit formed by capacitor C1 and switches Q1-Q4. For example, switch Q5 can be coupled between terminal a' of capacitor C4 and high voltage terminal i of the input port, switch Q6 can be coupled between terminal a' of capacitor C4 and the reference terminal of the input port, switch Q7 can be coupled between terminal b' of capacitor C4 and high voltage terminal o of the output port, and switch Q8 may be coupled between terminal b' of capacitor C4 and the reference terminal of the output port. In addition, the control methods of switches Q5-Q8 may be opposite to that of switches Q1-Q4.

Figure 20:
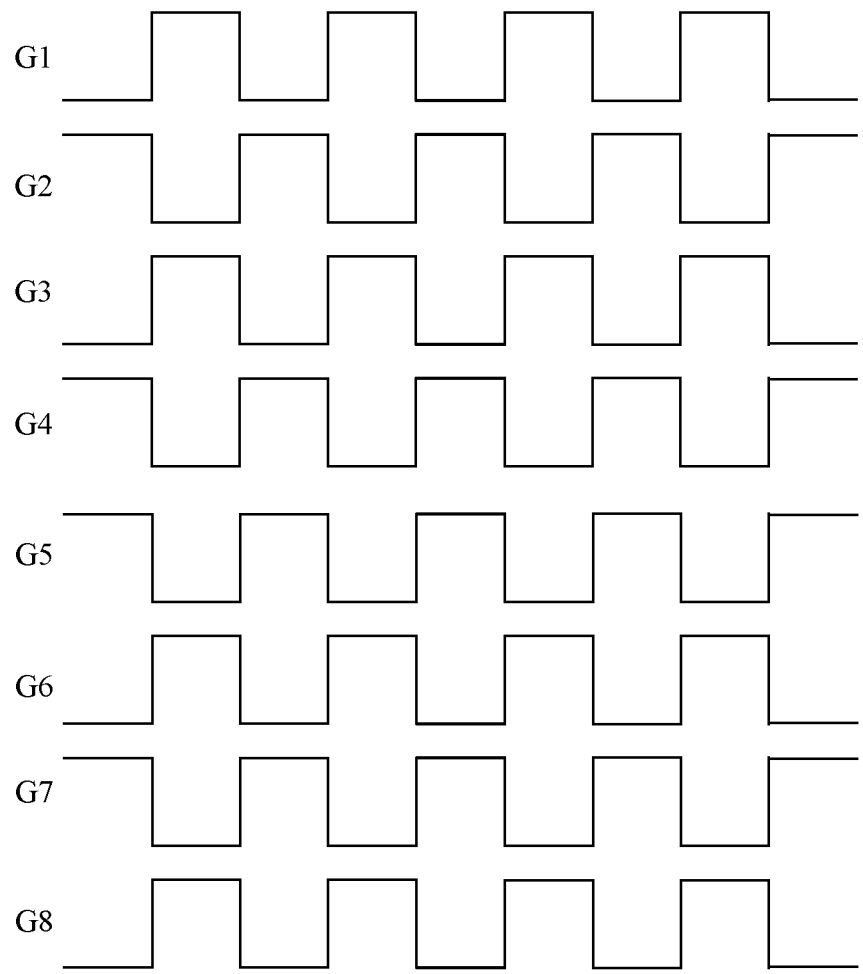
FIG. 20 is a waveform diagram of example control signals of the seventh example isolated converter with switched capacitors, in accordance with embodiments of the present invention.

Referring now to FIG. 20, shown is a waveform diagram of example control signals of the seventh example isolated converter with switched capacitors, in accordance with embodiments of the present invention. In this particular example, switches Q1-Q8 can be respectively controlled by control signals G1-G8. Control signals G1, G3, G6 and G8 may be in phase, and control signals G2, G4, G5 and G7 can be in phase, but the two groups of control signals may be opposite (or complementary) to each other. Correspondingly, under the control of control signals G1-G8, switches Q1, Q3, Q6 and Q8 can be turned on, and switches Q2, Q4, Q5 and Q7 may be turned off, and the isolated converter with switched capacitors may be in the first state. Switches Q1, Q3, Q6 and Q8 can be turned off, and switches Q2, Q4, Q5 and Q7 may be turned on, thus the isolated converter with switched capacitors can be in the second state. The isolated converter with switched capacitors may periodically switch between the first state and the second state, in order to continuously provide power to the output port.

Figure 21:
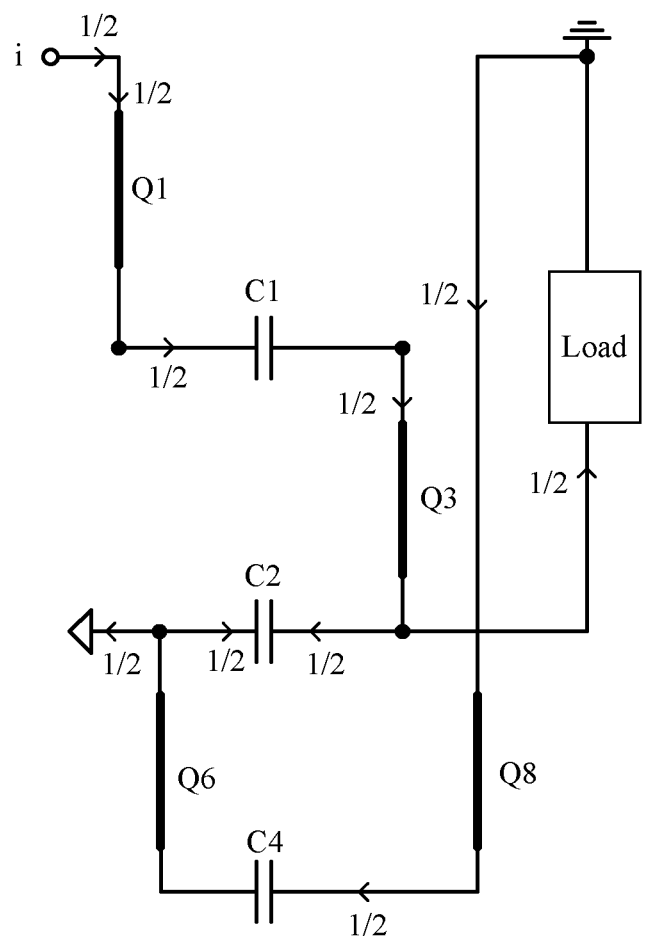
FIG. 21 is an example equivalent circuit diagram of the seventh example isolated converter with switched capacitors in the first state, in accordance with embodiments of the present invention.
Figure 22:
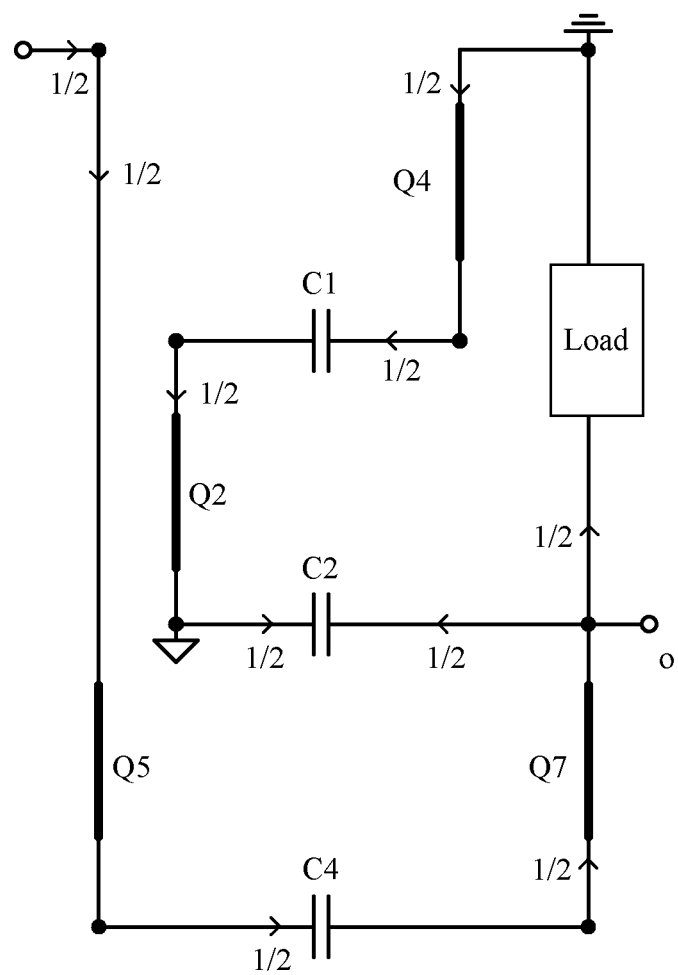
FIG. 22 is an example equivalent circuit diagram of the seventh example isolated converter with switched capacitors in the second state, in accordance with embodiments of the present invention.

Referring now to FIGS. 21 and 22, shown are example equivalent circuit diagrams of the seventh example isolated converter with switched capacitors in the first/second state, in accordance with embodiments of the present invention. In FIG. 21, in the first state (e.g., when switches Q1, Q3, Q6 and Q8 are turned on, and switches Q2, Q4, Q5 and Q7 are turned off), capacitors C1 and C2 can be coupled in series between two terminals of the input port, and capacitors C2 and C4 may be coupled in series between the two terminals of the output port. The input port can charge capacitors C1 and C2, and capacitors C2 and C4 can charge the output port. Since capacitor C2 may be both charged and discharged, when the circuit parameters are set symmetrically and the duty cycle of control signals G1-G8 is set to 50%, the current flowing through capacitor C2 is zero. In such a case, the actual current path of the isolated converter with switched capacitors in the first state is high voltage terminal i of the input port, switch Q1, capacitor C1, switch Q3, the load, switch Q8, capacitor C4, switch Q6, and the reference terminal of the input port. If the current from the input port is ½, the currents flowing through the above components will be equal to ½.

As shown in FIG. 22, in the second state (e.g., when switches Q1, Q3, Q6 and Q8 are turned on, and switches Q2, Q4, Q5 and Q7 are turned off), capacitors C1 and C2 can be coupled in series between two terminals of the output port, and capacitors C2 and C4 may be coupled in series between the two terminals of the input port. The input port can charge capacitors C4 and C2, and capacitors C1 and C2 can charge the output port. Since capacitor C2 may be both charged and discharged, when the circuit parameters are set symmetrically and the duty cycle of control signals G1-G8 is set to 50%, the current flowing through capacitor C2 is zero. In such a case, the actual current path of the isolated converter with switched capacitors in the second state can be the high voltage terminal i of the input port, switch Q5, capacitor C4, switch Q7, the load, switch Q4, capacitor C1, switch Q2, and the reference terminal of the input port. For example, if the current from the input port is ½, the currents flowing through the above components will be equal to ½.

In either state, the output port can be powered, the output current may be continuous, and the current ripple can be relatively small. Since the charging current and discharging current of capacitor C2 may cancel each other out, the capacitance value of capacitor C2 can be set to be relatively small. Also, since the isolated converter with switched capacitors of this example is provided with two parallel structures, each structure may only need to bear half of the output power, thus improving the system efficiency.

Figure 23:
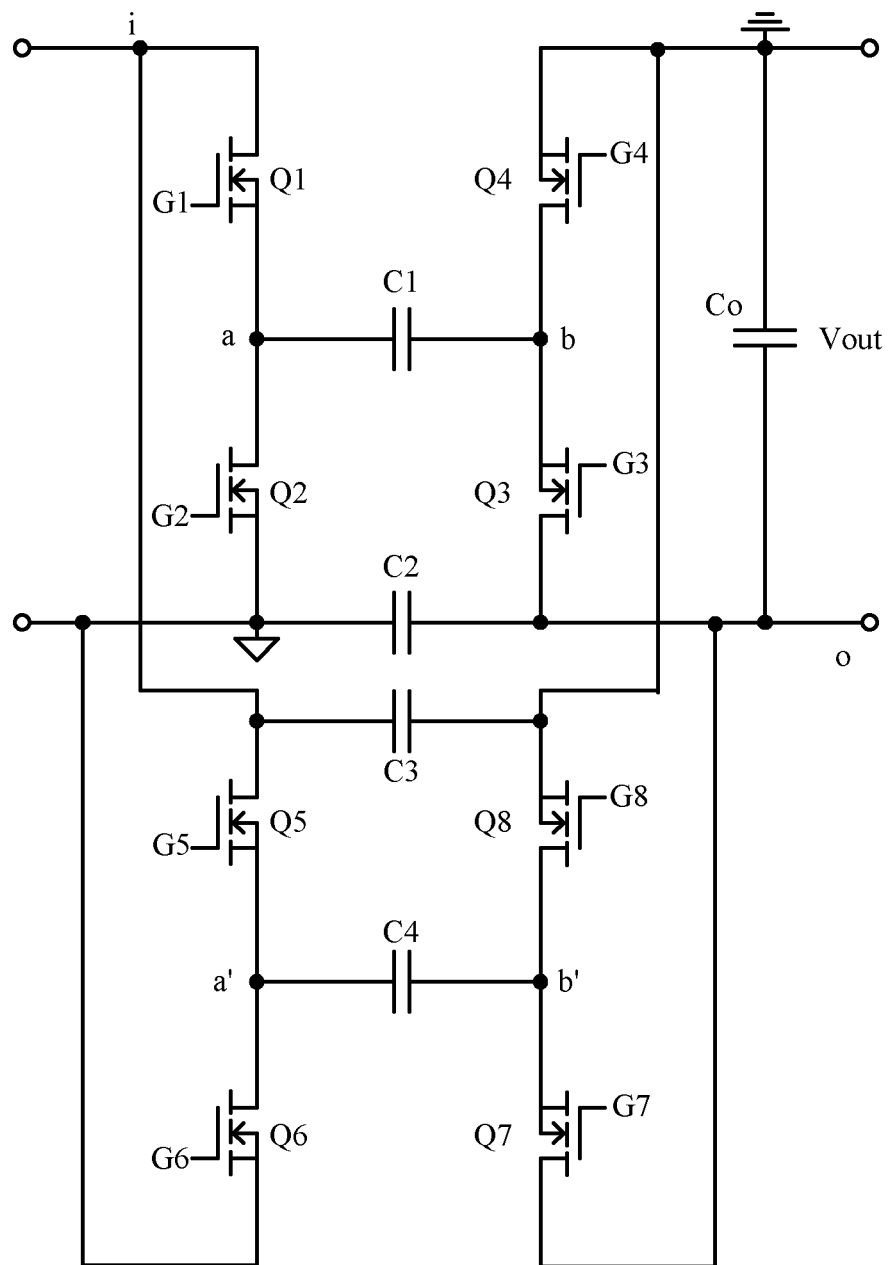
FIG. 23 is a schematic block diagram of an eighth example isolated converter with switched capacitors, in accordance with embodiments of the present invention.

Referring now to FIG. 23, shown is a schematic block diagram of an eighth example isolated converter with switched capacitors, in accordance with embodiments of the present invention. In this particular example, capacitor C3 can be coupled between high voltage terminal i of the input port and the reference terminal of the output port. For example, control methods for switches Q1-Q8 in this example can be the same as in the seventh example, as discussed above.

Figure 24:
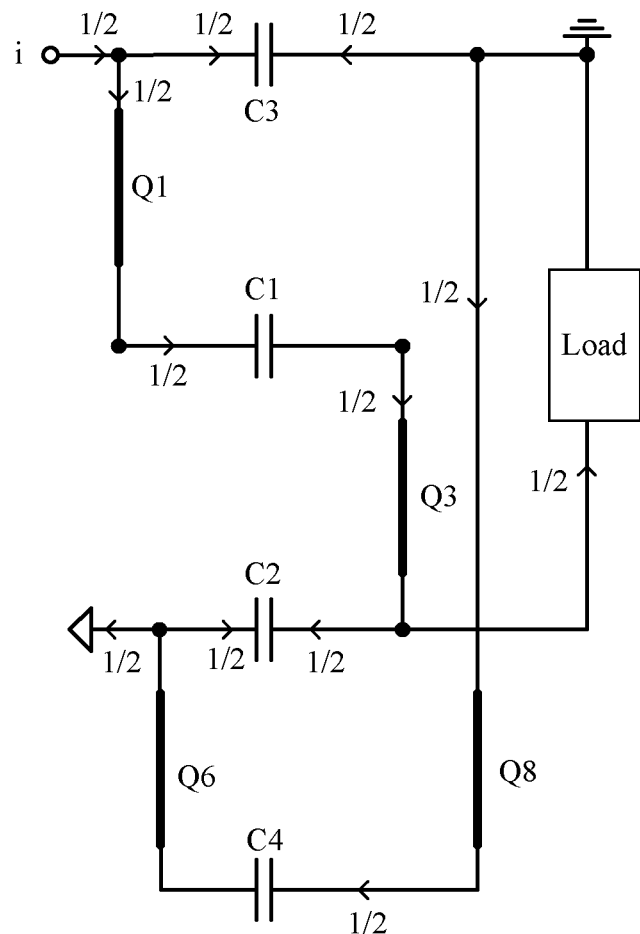
FIG. 24 is an example equivalent circuit diagram of the eighth example isolated converter with switched capacitors in the first state, in accordance with embodiments of the present invention.
Figure 25:
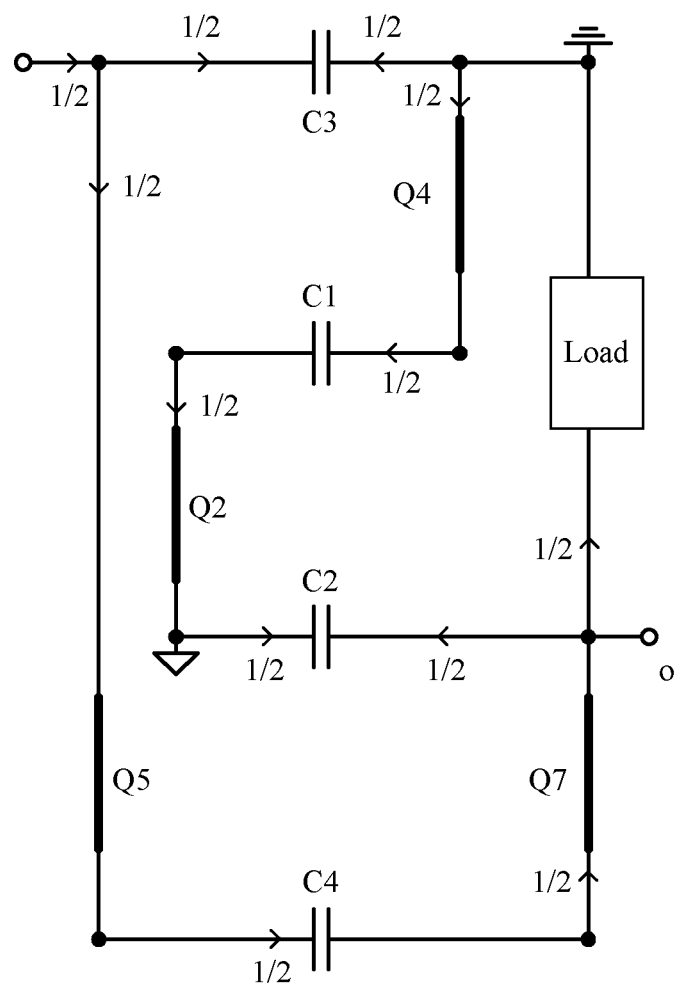
FIG. 25 is an example equivalent circuit diagram of the eighth example isolated converter with switched capacitors in the second state, in accordance with embodiments of the present invention.

Referring now to FIGS. 24 and 25, shown are example equivalent circuit diagrams of the eighth example isolated converter with switched capacitors in the first/second state, in accordance with embodiments of the present invention. In FIG. 24, in the first state (e.g., when switches Q1, Q3, Q6 and Q8 are turned on, and switches Q2, Q4, Q5 and Q7 are turned off), capacitors C1 and C2 can be coupled in series between two terminals of the input port, and capacitors C3 and C4 may be also coupled in series between the two terminals of the input port. The input port can respectively charge the two groups of series coupled capacitors. Also, for the output port, capacitors C1 and C3 can be coupled in series between two terminals of the output port, and capacitors C2 and C4 may be coupled in series between two terminals of the output port, the two groups of series coupled capacitors supply power to the output port. Thus, capacitors C2 and C3 can both be charged and discharged, such that the actual currents flowing through capacitors C2 and C3 are zero. In such a case, the actual current path of the isolated converter with switched capacitors in the first state can be high voltage terminal i of the input port, switch Q1, capacitor C1, switch Q3, the load, switch Q8, capacitor C4, switch Q6, and the reference terminal of the input port. For example, if the current from the input port is ½, the currents flowing through the above components can equal to ½.

As shown in FIG. 25, in the second state (e.g., when switches Q1, Q3, Q6 and Q8 are turned on, and switches Q2, Q4, Q5 and Q7 are turned off), capacitors C1 and C2 can be coupled in series between two terminals of the output port, and capacitors C3 and C4 may be coupled in series between the two terminals of the output port. The two groups of series coupled capacitors may supply power to the output port. Also, for the input port, capacitors C1 and C3 can be coupled in series between two terminals of the input port, and capacitors C2 and C4 may be coupled in series between two terminals of the input port, and the input port can charge the two groups of series coupled capacitors. In such a case, the actual current path of the isolated converter with switched capacitors in the second state can be high voltage terminal i of the input port, switch Q5, capacitor C4, switch Q7, the load, switch Q4, capacitor C1, switch Q2, and the reference terminal of the input port. For example, if the current from the input port is ½, the currents flowing through the above components can equal to ½.

Thus, a symmetrical structure may be formed in this example in order to provide more current paths. In this way, further reduction of the power required to bear by each component can be reduced, and efficiency can be improved. In addition, normal operation of the isolated converter with switched capacitors can be maintained when one of capacitors C2 and C3 are damaged, in order to provide redundancy.

Figure 26:
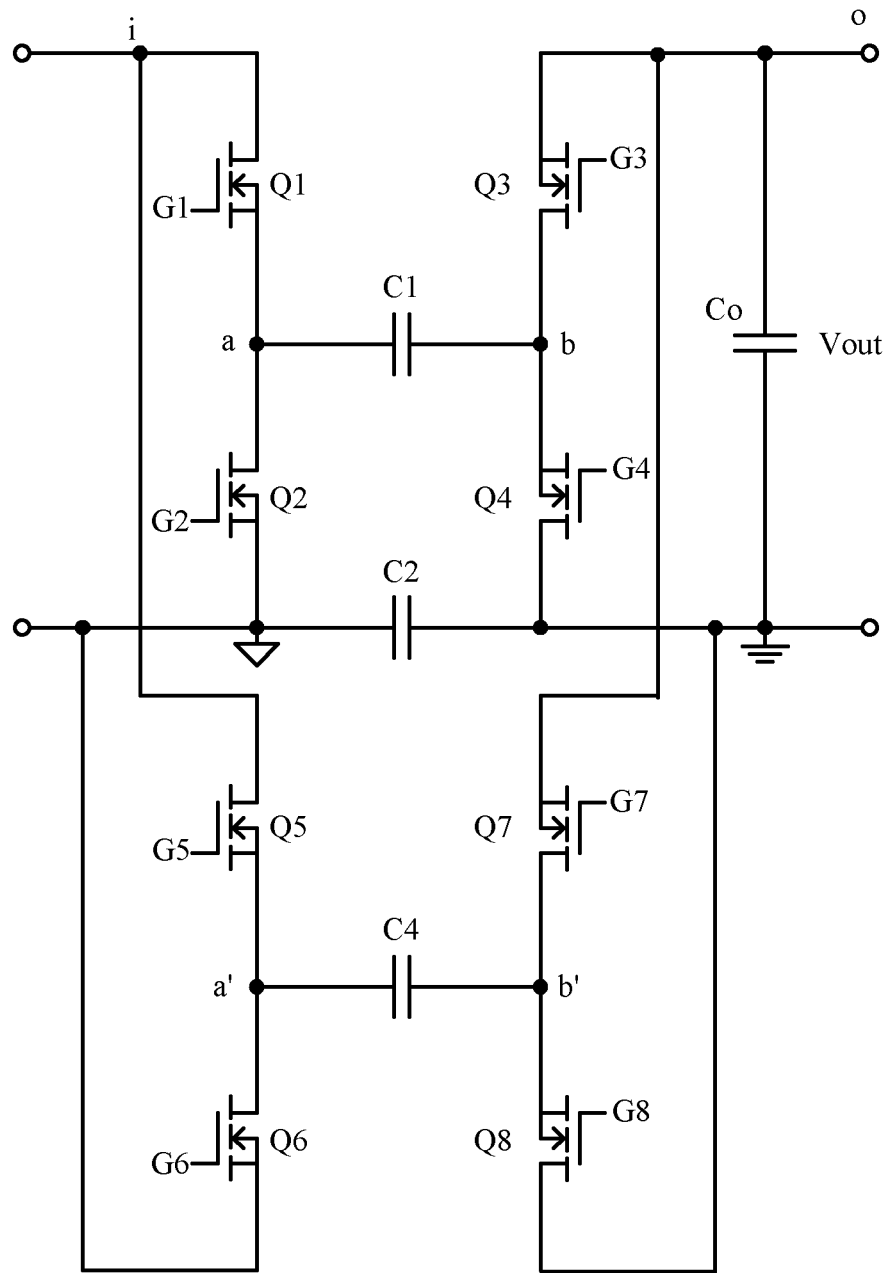
FIG. 26 is a schematic block diagram of a ninth example isolated converter with switched capacitors, in accordance with embodiments of the present invention.

Referring now to FIG. 26, shown is a schematic block diagram of a ninth example isolated converter with switched capacitors, in accordance with embodiments of the present invention. In this particular example, capacitor C4, switches Q5 and Q6, and switches Q7 and Q8 can be included. Capacitor C4, and switches Q5-Q8 may form an "H"-shape circuit to couple with the input port and the output port. The "H"-shape circuit may have the same topology as the circuit formed by capacitor C1 and switches Q1-Q4. That is, switch Q5 can be coupled between terminal a' of capacitor C4 and high voltage terminal i of the input port, switch Q6 may be coupled between terminal a' of capacitor C4 and the reference terminal of the input port, switch Q7 can be coupled between terminal b' of capacitor C4 and high voltage terminal o of the output port, and switch Q8 can be coupled between terminal b' of capacitor C4 and the reference terminal of the output port.

For example, the control methods of switches Q5-Q8 may be opposite to switches Q1-Q4. That is, switches Q1-Q8 can be controlled by control signals G1-G8, as shown in FIG. 20. Thus, in the first state, switches Q1, Q3, Q6 and Q8 can be turned on, and switches Q2, Q4, Q5 and Q7 are turned off. Also, in the second state, switches Q1, Q3, Q6 and Q8 may be turned off, and switches Q2, Q4, Q5 and Q7 can be turned on. The isolated converter with switched capacitors in this example may form different current paths in different states, and can supply power to the load by repeating the charge and discharge processes. Moreover, due to the capacitor between the input port and the output port, the input port and the output port can be substantially isolated from each other. In either state, the output port can be powered, the output current may be continuous, and the current ripple can be relatively small. Since the charging current and discharging current of capacitor C2 may cancel each other out, the capacitance value of capacitor C2 can be set as a relatively. Also, since the isolated converter with switched capacitors of this example is provided with two parallel structures, each structure need only bear half of the output power, thus improving the system efficiency.

Figure 27:
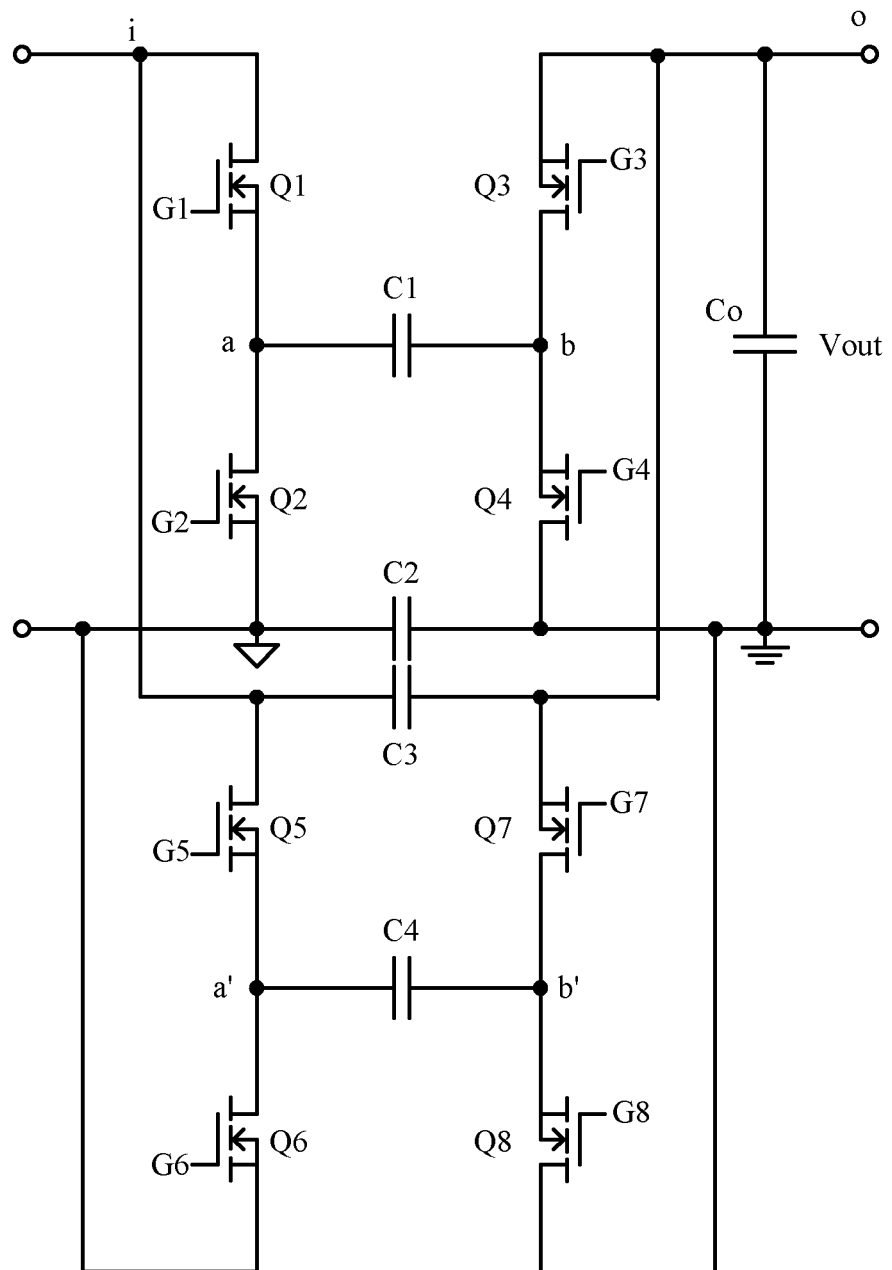
FIG. 27 is a schematic block diagram of a tenth example isolated converter with switched capacitors, in accordance with embodiments of the present invention.

Referring now to FIG. 27, shown is a schematic block diagram of a tenth example isolated converter with switched capacitors, in accordance with embodiments of the present invention. In this particular example, capacitor C3 can be coupled between the high voltage terminals of the input port and the output port. For example, control methods for switches Q1-Q8 in this example can be substantially the same as in the ninth example, as discussed above. A symmetrical structure may thus be formed in order to provide more current paths. In this way, the power required to bear by each component can be reduced and efficiency improved. In addition, the normal operation of the isolated converter with switched capacitors can be maintained when one of capacitors C2 and C3 damaged, in order to provide redundancy.

In particular embodiments, the switches on the secondary-side (e.g., the switches with one terminal coupled to the high voltage terminal or ground terminal of the output port) can be replace with diodes. For example, the cathode of the diode can be coupled to the end near the high voltage terminal of the output port, and the anode may be coupled to the end near the low voltage terminal of the output port.

Figure 28:
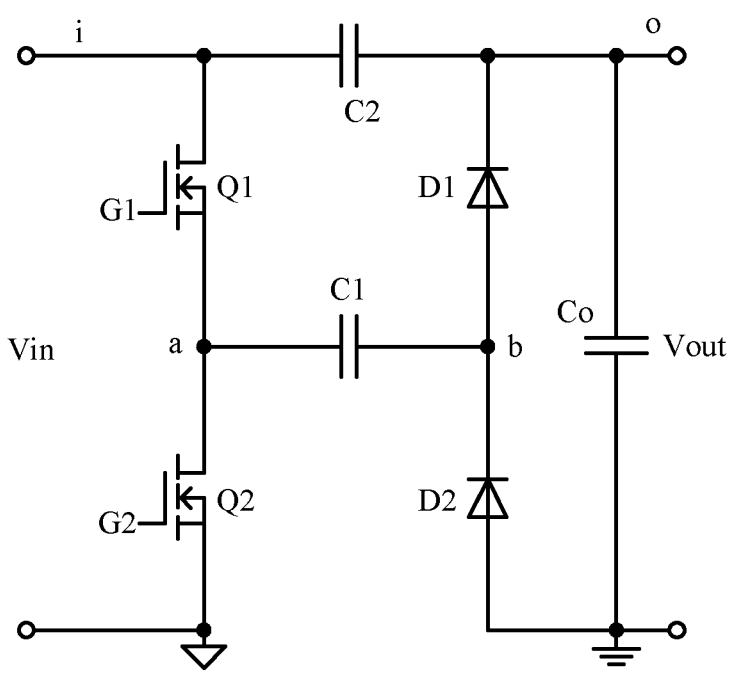
FIG. 28 is a schematic block diagram of yet another example isolated converter with switched capacitors, in accordance with embodiments of the present invention.

Referring now to FIG. 28, shown is a schematic block diagram of yet another example isolated converter with switched capacitors, in accordance with embodiments of the present invention. In this particular example, switches Q3 and Q4 as shown above can be replaced with diodes D1 and D2. The anode of diode D1 can be coupled to terminal b of capacitor C1, and the cathode may be coupled to the high voltage terminal of the output port. The anode of diode D2 can be coupled to the reference terminal of the output port, and the cathode may be coupled to terminal b of capacitor C1. Due to the unidirectional conduction characteristics of the diode, diodes D1 and D2 can control the change of the current path with the on and off of switches Q1 and Q2, in order to achieve the purpose of supplying power to the output port in an isolated manner. For the circuit structures in the other examples discussed above, the switches at the secondary side can similarly be replaced with diodes.

In particular embodiments, by serially setting a first group of switches between two terminals of the input port, by serially setting a second group of switches between two terminals of the output port, and by setting a first capacitor between the intermediate terminals of two groups of switches and a second capacitor between one terminal of the input port and one terminal of the output port, isolation of the input port from the output port can be achieved. In addition, by controlling the first group of switches and the second group of switches to turn on or turn off, and by controlling the charge and discharge processes of the first capacitor and the second capacitor, voltage conversion can be realized. Since the input port and the output port are isolated in these examples, the input power supply may not be substantially affected by current ripple at the output side. Further, since the converter can realize isolation without using any winding, the size of the isolated converter can be made smaller, such that the isolated converter is suitable for miniaturization product applications.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An isolated converter, the isolated converter comprising:
   a) a first capacitor;
   b) a first group of power devices coupled between two terminals of an input port, wherein said first group of power devices is configured to selectively couple a first terminal of said first capacitor to a first terminal of said input port in a first state and to a second terminal of said input port in a second state;
   c) a second group of power devices coupled between two terminals of an output port, wherein said second group of power devices is configured to selectively couple a second terminal of said first capacitor to a first terminal of said output port in said first state and to a second terminal of said output port in said second state; and
   d) a second capacitor coupled between one of said first and second terminals of said input port and one of said first and second terminals of said output port.

2. The isolated converter of claim 1, wherein said first and second groups of power devices are controlled such that said isolated converter is alternately switched between said first state and said second state.

3. The isolated converter of claim 2, wherein in either state, said first and second capacitors are coupled in series between said two terminals of any one of said input port and said output port for isolation, in order to eliminate effects of said output port on said input port.

4. The isolated converter of claim 2, wherein:
   a) said first and second capacitors are coupled in series between said first and second terminals of said input port when said isolated converter is in said first state; and
   b) said first and second capacitors are coupled in series between said first and second terminals of said output port when said isolated converter is in said second state.

5. The isolated converter of claim 4, wherein said second capacitor is coupled between said first terminal of said input port and said second terminal of said output port, or said second terminal of said input port and said first terminal of said output port.

6. The isolated converter of claim 2, wherein:
   a) said first and second capacitors form a current path through which said input port supplies power to said output port when said isolated converter is in said first state; and
   b) said first and second capacitors form a charge equalization loop when said isolated converter is in said second state.

7. The isolated converter of claim 6, wherein said second capacitor is coupled between said first terminal of said input port and said first terminal of said output port, or said second terminal of said input port and said second terminal of said output port.

8. The isolated converter of claim 1, further comprising a third capacitor coupled between one terminal of said input port that is not coupled to said second capacitor, and one terminal of said output port that is not coupled to said second capacitor.

9. The isolated converter of claim 1, wherein:
   a) said first group of power devices comprises a first power device coupled between said first terminal of said input port and said first terminal of said first capacitor, and a second power device coupled between said second terminal of said input port and said first terminal of said first capacitor; and
   b) said second group of power devices comprises a third power device coupled between said first terminal of said output port and said second terminal of said first capacitor, and a fourth power device coupled between said second terminal of output port and said second terminal of said first capacitor.

10. The isolated converter of claim 9, wherein each of said first, second, third, and fourth power devices is a switch.

11. The isolated converter of claim 9, wherein at least one of said third and fourth power devices is a diode.

12. The isolated converter of claim 10, wherein:
   a) said first and third power devices are controlled according to a first control signal;
   b) said second and fourth power devices are controlled according to a second control signal; and
   c) said first and second control signals are complementary.

13. The isolated converter of claim 2, further comprising:
   a) a fourth capacitor;
   b) a third group of power devices coupled in series between said first and second terminals of said input port, wherein said third group of power devices is configured to selectively couple a first terminal of said fourth capacitor to said first terminal of said input port in said second state and to said second terminal of said input port in said first state; and
   c) a fourth group of power devices coupled in series between said first and second terminals of said output port, wherein said fourth group of power devices is configured to selectively couple a second terminal of said fourth capacitor to said first terminal of said output port in said second state and to said second terminal of said output port in said first state.

14. The isolated converter of claim 13, wherein said first, second, third, and fourth groups of power devices are controlled such that said isolated converter is alternately switched between said first and said second states.

15. The isolated converter of claim 14, wherein:
   a) said first group of power devices comprises a first power device coupled between said first terminal of said input port and said first terminal of said first capacitor, and a second power device coupled between said second terminal of said input port and said first terminal of said first capacitor;
   b) said second group of power devices comprises a third power device coupled between said first terminal of said output port and said second terminal of said first capacitor, and a fourth power device coupled between said second terminal of output port and said second terminal of said first capacitor;
   c) said third group of power devices comprises a fifth power device coupled between said first terminal of said input port and said first terminal of said fourth capacitor, and a sixth power device coupled between said second terminal of said input port and said first terminal of said fourth capacitor; and
   d) said fourth group of power devices comprises a seventh power device coupled between said first terminal of said output port and said second terminal of said fourth capacitor, and an eighth power device coupled between said second terminal of output port and said second terminal of said fourth capacitor.

16. The isolated converter of claim 15, wherein each of said first, second, third, fourth, fifth, sixth, seventh, and eighth power devices is a switch.

17. The isolated converter of claim 16, wherein:
a) said first, third, sixth, and eighth switches power devices are controlled according to a first control signal;
b) said second, fourth, fifth, and seventh switches power devices are controlled according to a second control signal; and
c) said first and second control signals are complementary.

18. The isolated converter of claim 12, wherein said first and second control signals are complementary and a dead zone is provided therebetween.

19. The isolated converter of claim 16, wherein at least one of said third, fourth, seventh, and eighth power devices is a diode.

* * * * *